Patented Nov. 18, 1930

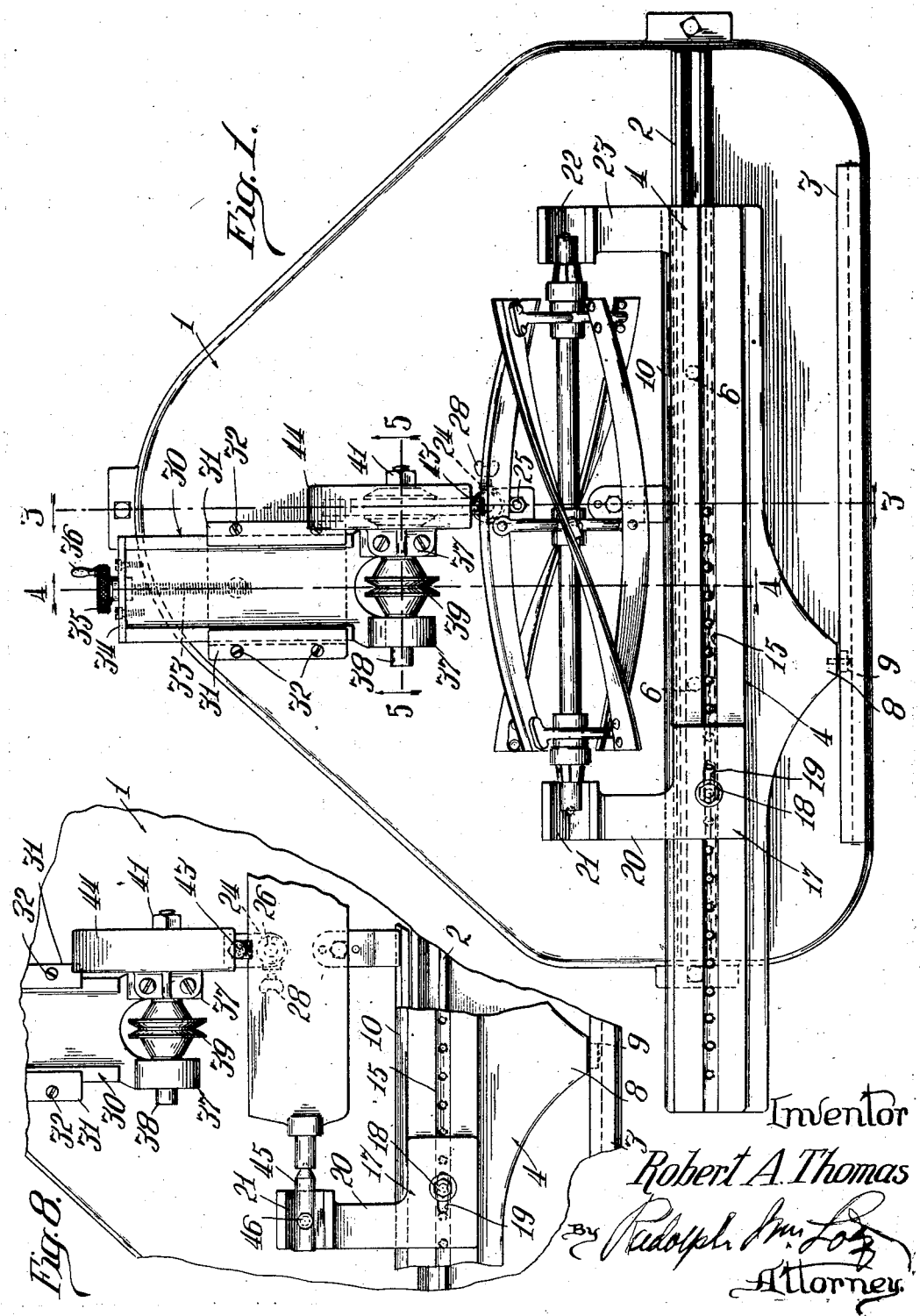

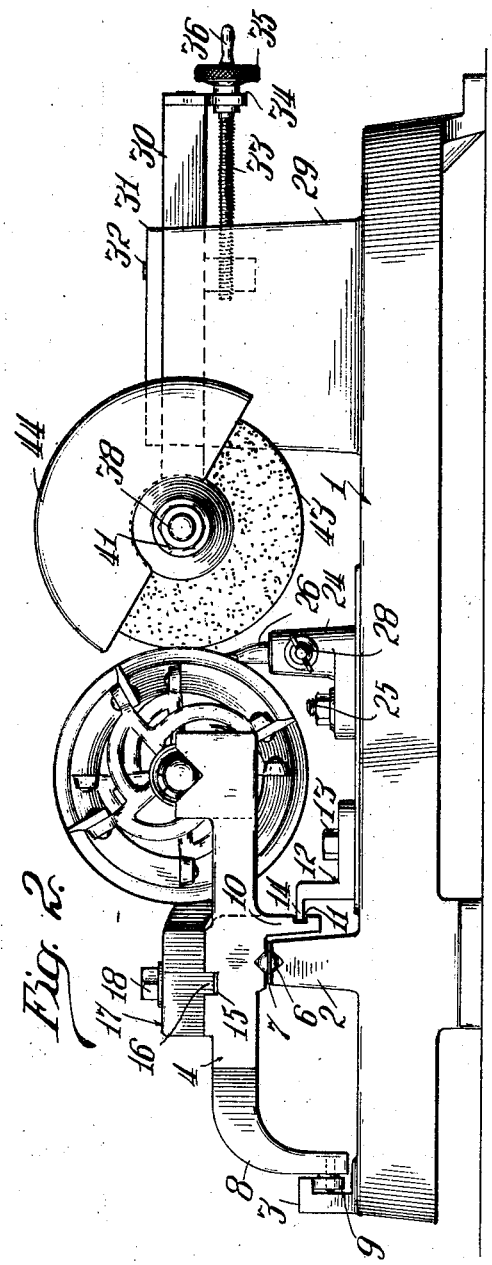
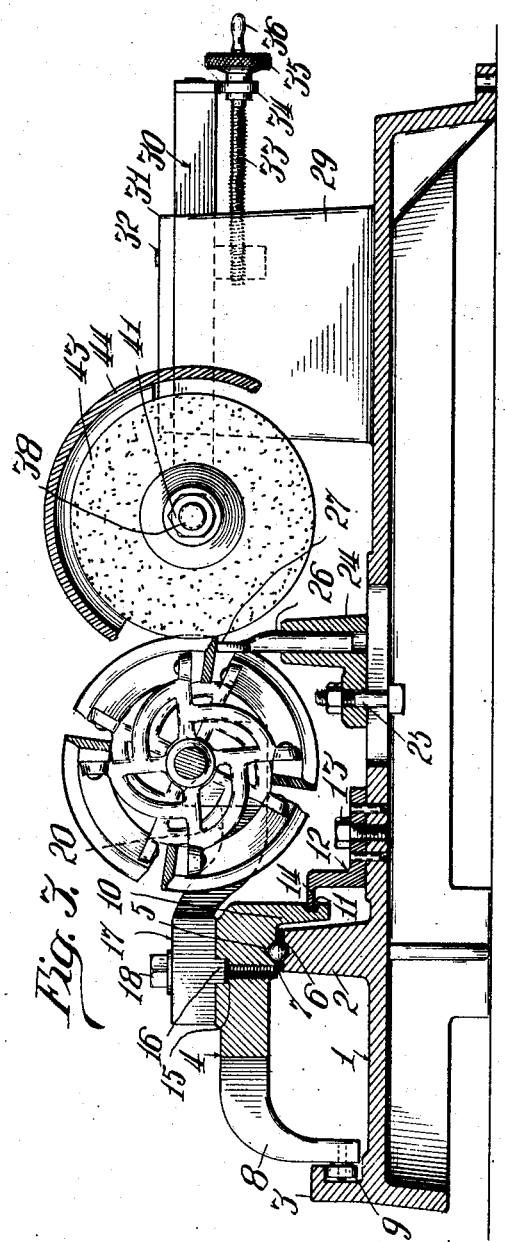

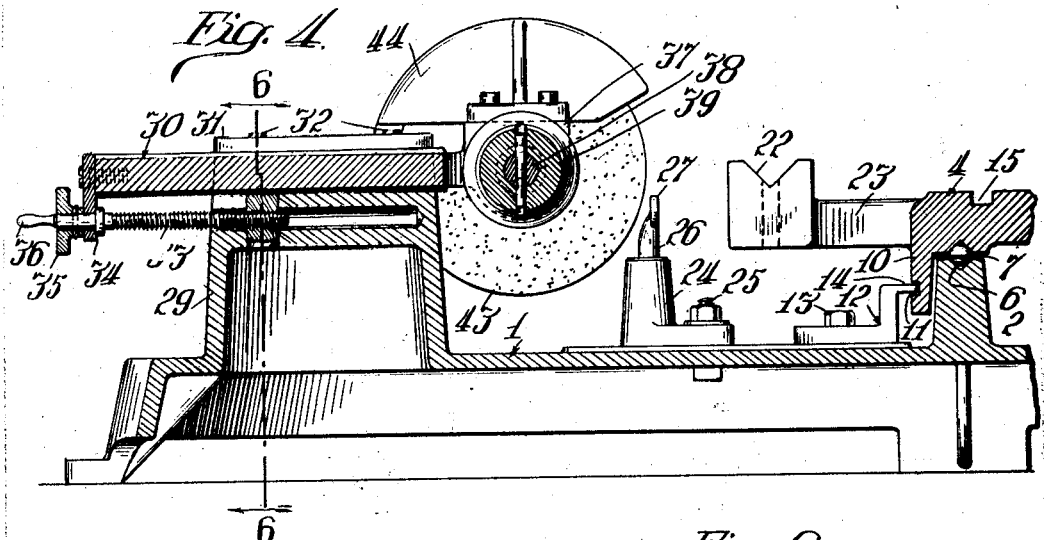
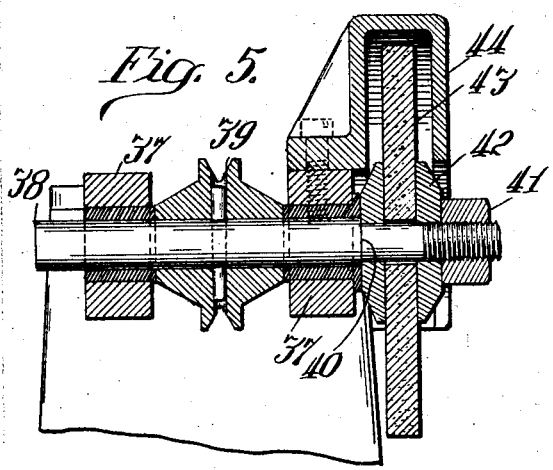
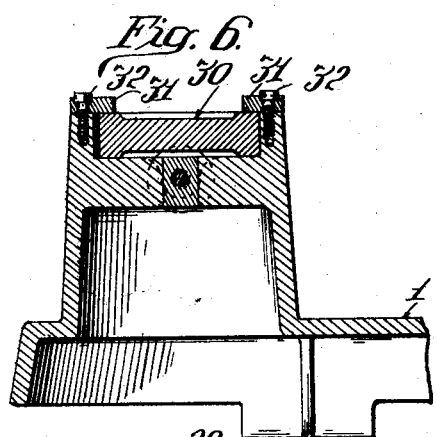
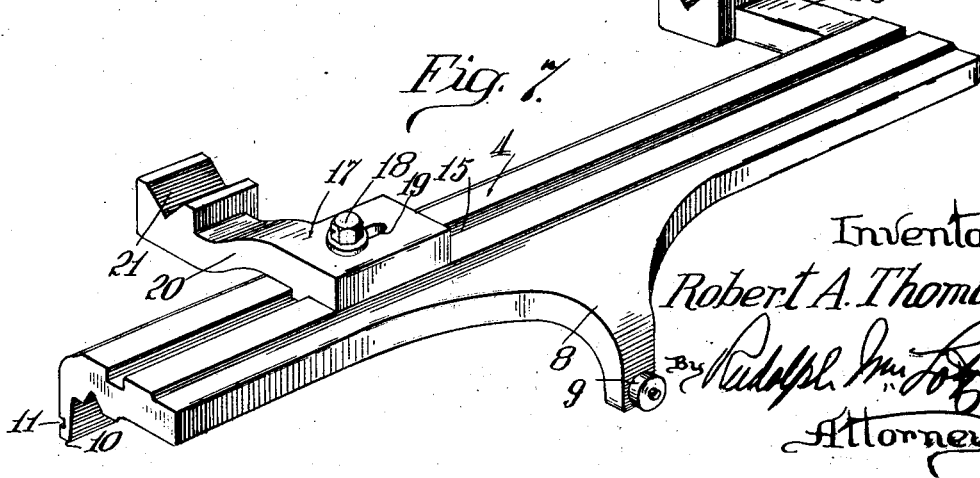

1,782,154

UNITED STATES PATENT OFFICE

ROBERT A. THOMAS, OF LOMBARD, ILLINOIS

MACHINE FOR GRINDING MOWER ELEMENTS

Application filed June 16, 1928. Serial No. 285,920.

This invention has for its object to provide a simple and efficient machine for sharpening the blades of rotors and the ledger or shear-plates of lawn mowers with speed and accuracy.

The invention consits in the novel features of construction and combinations of parts hereinafter fully described and claimed.

In the accompanying drawings illustrating the invention:

Fig. 1 is a plan view of a grinding machine constructed in accordance with the invention.

Fig. 2 is a side elevation of the same.

Fig. 3 is a vertical sectional view on the line 3—3 of Fig. 1.

Fig. 4 is a vertical section on the line 4—4 of Fig. 1.

Fig. 5 is a vertical section on the line 5—5 of Fig. 1.

Fig. 6 is a detail section on the line 6—6 of Fig. 4.

Fig. 7 is a perspective view of the carriage on which the element to be ground is supported.

Fig. 8 is a fragmentary plan view showing a ledger or shear-plate mounted in the carriage.

The sharpening of lawn mower rotors and ledger or shear-plates is a rather delicate operation because great care must be exercised in the case of the blades of the rotor to maintain the sharp edges in a true cylindrical plane concentric with its axis of rotation while the cooperating edge of the ledger or shear-plate must be so ground that said edge, when properly adjusted upon the mower frame, will be disposed parallel with said axis of rotation. The fact that the rotor blades are slightly helical renders the grinding operation more difficult and one of the main objects of the invention is, therefore, to provide very simple and efficient cooperating elements for effecting accurate grinding of said blades.

The machine comprises a suitable bed or base plate 1 which is approximately triangular and is equipped at its wider or rear end portion with an integral upstanding rail 2 having a V-shaped groove in its upper edge. This rail is straight and extends from side edge to side edge of the base parallel with the rear edge of the latter. Along the rear edge of said base there is an inverted L-shaped flange 3.

Mounted upon the rail 2 for travel longitudinally thereof is a carriage 4 having a V-shaped groove 5 in its lower face in which and the similar groove of the rail 2 a series of anti-friction balls 6 are engaged for supporting the carriage 4, the said balls 6 being maintained in equally spaced relation by means of the perforated strip 7 of suitable metal loosely disposed between the rail and carriage.

Midway between the ends of the latter and projecting from its rear edge is an arm 8 carrying an anti-friction roller 9 which engages the free flange of the member 3 and which serves to prevent appreciable rocking of said carriage on the longtiudinal axis intersecting the balls 6. At the front edge of the said carriage 4 there is a depending flange 10 provided in its outer face with a longitudinal groove 11. Mounted on the base-plate 1 midway between its side edges is a substantially Z-shaped member 12 which is secured in place by means of a set-screw 13, which permits of its adjustment vertically, the arm or projection 14 of said member 12 engaging in the groove 11 and cooperating with the roller 9 and member 3 to hold the carriage 4 against the rocking movement above referred to and also against being lifted.

In the upper face of the carriage is a longitudinal guide groove 15 in which the rib 16 of a bracket member 17 engages. In the bottom of this slot and extending through the carriage are spaced tapped openings to receive the set-screw 18 passing through the longitudinal slot 19 in the member 17. The latter is provided with an arm 20 in the outer end portion of which is a V-shaped groove 21 which is axially aligned, when the said member 17 is firmly clamped upon the carriage 4, with a similar groove 22 in an arm 23 integral with and disposed at one end of the carriage 4, said grooves being adapted to receive the trunnions of the part to be ground as shown in Fig. 1 and automatically causing the axis of said trunnions to be disposed parallel with the line of travel of the carriage 4 on the rail 2. Obviously the bracket member 17 may be varied and adjusted to receive elements of different lengths.

Mounted on the bed-plate 1 midway between its side edges and in front of the member 17 is a post-member 24 also secured by means of a set-screw 25 engaging in a slot in the base member for adjusting the position of the member 24 with respect to its distance from the rail 2. This post-member has a vertical bore or socket to receive a member 26 having a cylindrical shank and a flat end portion 27 upon which the blade being ground is supported during the grinding operation. This member 26 is vertically adjustable by means of the set or wing-screw 28.

At the front of the base 1 and cast integral therewith is support 29 for the carriage 30 which is reciprocable transversely of the travel of the carriage 4. The support 29 is provided in its upper face with a guide groove to receive the carriage 30, the latter being accurately held in place by means of the overhanging guide plates 31 secured to the top face of the support by means of set-screws 32. Parallel with and below the guide groove of said support is a tapped opening in which the threaded shank of an adjusting screw 33 engages, the latter being also engaged with a depending flange 34 at the rear end of the carriage 30 for rotation relatively to said flange while suitably held against longitudinal movement relatively to said flange. Said adjusting screw is equipped with a hand-wheel 35 and crank-arm 36 for operating the same.

At the front of the carriage 30, I provide a pair of bearings 37 for the shaft or spindle 38 upon which a sheave 39 is rigidly mounted, said sheave 39 having a hub-portion corresponding in length with the free space between the bearings 37 to thus hold the shaft or spindle 38 against longitudinal movement. One end portion of said shaft or spindle 38 is of reduced diameter to provide the annular shoulder 40 and is threaded at its free end to receive the nut 41 by means of which the side or hub-plates 42 of the grinding wheel 43 are clamped against the said shoulder 40 and said wheel 43 in the customary manner.

Firmly secured to one of the bearings 37 is a hood 44 for the wheel 43.

In the operation of grinding the blades of a rotor to sharpen the same, the rotor is supported by its trunnions in the V-shaped grooves 21 and 22 of the bracket member 17 and arm 23, the bracket member being adjusted in position relatively to the arm so that the end faces of the hubs of the rotor will be in contact with opposed side faces of the members 17 and 23 and the rotor thus held against longitudinal movement relatively to the carriage 4. A blade of the rotor is now brought to rest upon the member 26 and the latter is then adjusted in height to cooperate with the wheel 43 to grind the edge of the supported rotor blade to a given level.

The carriage 30 is then adjusted to bring the wheel 43 to proper position to do the grinding and the carriage 4 is then reciprocated to cause the blade edge to be uniformly ground, it being obvious that during reciprocation of the carriage 4 the rotor will be rotated through an arc equal to the helical spacing from each other of the opposite ends of the blade.

When one of the blades has been sharpened, the carriage is moved to a position at which one end of the rotor has passed the member 26 whereupon it is rotated sufficiently to bring another blade in position for support on the member 26 whereupon the grinding is continued, the several blades being thus successively sharpened and, obviously, the wheel 43 retains its position, all of the sharpened blade edges will be disposed in a cylindrical plane concentric with the axis of rotation of the rotor. In the event that in the grinding operation it is found that the wheel 43 does not effect grinding of a blade edge, it will be because that blade edge is of less radius than it should be and thereupon the wheel 43 will have to be readjusted to grinding position and the remaining blades ground away until all blade edges are disposed in such a cylindrical plane.

The ledger or shear-plates of lawn mowers may also be sharpened and ground in the machine but require the employment of centering devices 45 which are secured in the recesses 21 and 22 by means of set screws 46 engaging in tapped openings in the bottom of said recesses. These devices engage in the centre-punch recesses in the ends of the trunnions of the blades the latter being also supported upon the member 26 adjusted to suit. The member 26 and wheel 43 may obviously be relatively adjusted to permit the wheel 43 to grind both the top and front edges of said blade successively so that the top edge of the cutting edge of said blade may be adjusted to an accurately parallel position with respect to the axis of the rotor for efficient cooperation with the latter.

Obviously the carriage 4 may be equipped with additional devices for supporting ledger or shear-blades between their ends, such devices being deemed unnecessary of illustration.

While I have described and illustrated the machine as particularly adapted for the specific purposes set forth, it will be understood that it may, either in its present or a slightly modified form, be employed for grinding and sharpening devices other than the cutting elements of mowers.

It will be further understood that the sheave on the shaft of the wheel 43 must be associated by means of a belt with a source of power and, also, that said sheave may represent an electric motor.

I claim as my invention:

A grinding machine comprising a horizontal support or bed plate, an upwardly projecting longitudinal flange along one edge thereof provided with a longitudinal groove in its inner face, an upstanding longitudinal rib between the side edges of said bed plate parallel with said flange and having a V-shaped groove in its upper face, a carriage provided in its lower face with a V-shaped groove opposed to the groove of said rib, antifriction balls interposed between said rib and said carriage and confined in said grooves, an arm on said carriage equipped at its outer end with a roller engaging in the groove of said flange, a downwardly extending flange on said carriage overhanging said rib and provided in its exposed face with a longitudinal groove, a member removably mounted on said bed plate and engaging in said last-named groove, arms at opposite ends of said carriage provided at their outer ends with formations to receive and pivotally engage the axial terminals of a rotary cutter and hold the latter against longitudinal movement relatively to said carriage, a grinding wheel rotatable on an axis parallel with that of the supported rotary cutter arranged for adjustment toward and from said carriage, and a vertically adjustable stop element arranged proximately to the circumferential face of the grinding wheel and adjustable toward and from the carriage for cooperation to maintain a blade to be ground properly positioned relatively to the grinding wheel during reciprocation of said carriage, the said wheel rotating in a direction to maintain the blade being ground in firm contact with said stop element.

ROBERT A. THOMAS.